United States Patent
Craft et al.

(10) Patent No.: US 6,425,364 B1
(45) Date of Patent: Jul. 30, 2002

(54) TWO-STROKE DIRECT FUEL INJECTED MARINE ENGINE HAVING ANODIZED PISTON RING GROOVES

(75) Inventors: Todd D. Craft, Pleasant Prarie, WI (US); Gregory J. Binversie, Grayslake; Joseph Anton Pecina, Lindenhurst, both of IL (US)

(73) Assignee: Bombardier Motor Corporation of America, Grant, FL (US)

( * ) Notice: Subject to any disclaimer, the term of this patent is extended or adjusted under 35 U.S.C. 154(b) by 0 days.

(21) Appl. No.: 09/724,370

(22) Filed: Nov. 28, 2000

(51) Int. Cl.$^7$ .................................................. F02B 75/08
(52) U.S. Cl. .................................................. 123/193.6
(58) Field of Search ............................. 123/193.6, 65 R

(56) References Cited

U.S. PATENT DOCUMENTS

| | | |
|---|---|---|
| 2,606,085 A | 8/1952 | Kiekhaefer |
| 2,926,649 A | 3/1960 | Hicks |
| 3,806,139 A | 4/1974 | Suzuki et al. |
| 3,906,923 A | 9/1975 | Harker |
| 4,138,984 A | 2/1979 | Steidle et al. |
| 4,711,208 A | 12/1987 | Sandler et al. |
| 4,758,139 A | 7/1988 | Yagii |
| 4,949,689 A * | 8/1990 | Schlunke .................... 123/295 |
| 4,955,353 A | 9/1990 | Amataka et al. |
| 5,032,244 A | 7/1991 | Bommier et al. |
| 5,054,444 A * | 10/1991 | Morikawa .................... 123/295 |
| 5,063,894 A | 11/1991 | Mielke et al. |
| 5,433,405 A | 7/1995 | Steever |
| 5,531,195 A * | 7/1996 | Onoda et al. ............. 123/193.6 |
| 5,598,763 A * | 2/1997 | Rao et al. ...................... 92/212 |
| 5,713,325 A * | 2/1998 | Yoshida et al. ............. 123/295 |
| 5,759,640 A | 6/1998 | Mannava et al. |
| 5,884,600 A | 3/1999 | Wang et al. |
| 6,032,638 A * | 3/2000 | Kato ........................... 123/295 |

FOREIGN PATENT DOCUMENTS

| | | |
|---|---|---|
| AU | 102772 | 12/1937 |
| DE | 29 21 952 | 12/1980 |
| RU | 19682 | 6/1967 |

* cited by examiner

Primary Examiner—Marguerite McMahon
(74) Attorney, Agent, or Firm—Timothy J. Ziolkowski; J. Mark Wilkinson; Cook & Franke SC

(57) ABSTRACT

A piston for a two-stroke direct fuel injection internal combustion engine coupled to drive a marine propulsion unit is provided. The piston has a generally cylindrical body with one or more grooves formed therein. Each groove defines an opening to receive a respective piston ring. A thermal-protection coating is applied by anodizing the interior of the grooves. The respective region of the piston cylindrical body surrounding the respective groove openings is free of the coating.

31 Claims, 2 Drawing Sheets

TWO-STROKE DIRECT FUEL INJECTED MARINE ENGINE HAVING ANODIZED PISTON RING GROOVES

BACKGROUND OF THE INVENTION

The present invention is generally related to internal combustion engines, and, more particularly, the present invention is related to two-stroke direct fuel-injected engines having thermally-protected piston ring grooves by anodizing. Still more particularly, the invention relates to marine propulsion devices including such engines.

Management of piston/cylinder heat load has become more problematic as improvements in performance of marine internal combustion engines are achieved. For example, the heat load may be large during operation at high engine speeds. More particularly, due to the high temperature generated between one or more piston rings and the respective grooves for receiving such rings, detrimental conditions, such as micro-welding, coaking, and/or excessive wear due to hot scuffing, may develop between the grooves and the piston rings. It will be appreciated that the foregoing conditions may cause degradation in piston ring sealing performance that in turn can lead to undesirable and irreversible coaking of the grooves, higher exhaust emissions and could even lead to shortened useful life of the engine due to engine powerhead failures.

Although U.S. Pat. No. 4,955,353 purports to disclose an anodized layer formed on the lower part of the uppermost piston ring groove to somewhat protect the groove from excessive thermal conditions, that patent shows that the anodizing layer is not contained to within the interior of the groove. It is believed that not containing the anodized layer to only within the interior of the groove results in a diminished heat transfer path between the piston and the cylinder walls where the piston reciprocates. Further, in the specific context of a four-stroke engine, U.S. Pat. No. 5,884,600 appears to disclose a complicated multi-layering arrangement including a hard anodized first layer on the piston's skirt and piston ring grooves and a composite polymer atop the hard anodized layer on the piston's skirt. Thus, none of the above-referred patents allows for containing the anodized layer to only within the interior of the grooves and consequently it is believed that the piston of each of the above-referred patents fails to provide an undisturbed heat transfer path between the piston and the cylinder walls at least in the regions where the anodized layer extends outside the interior of the grooves.

Accordingly, it is desirable to provide a piston for an internal combustion engine which eliminates micro-welding and/or excessive wear between the piston rings and the respective grooves that receive such rings, while leaving undisturbed the heat transfer path between the piston and the cylinder wall by containing the hard anodized layer to only within the interior of the grooves. It is further desirable to render the piston applicable to high-output marine engines subject to relatively high combustion temperatures, such as two-stroke direct fuel-injected engines.

SUMMARY OF THE INVENTION

Generally speaking, the present invention fulfills the foregoing needs by providing in one exemplary embodiment thereof a marine direct fuel injection internal combustion engine made up of an engine block defining a cylinder having a longitudinal axis and an upper end. A piston is reciprocally moveable in the cylinder along its axis. The piston includes an upper surface portion and a generally cylindrical body extending from the upper surface. A cylinder head includes a lower surface portion closing the upper end of the cylinder to define a combustion chamber between the piston upper surface and the cylinder head lower surface portion. One or more grooves are formed in the piston cylindrical body. Each groove defines an opening to receive a respective piston ring. A thermal-protection coating, such as an anodic coating, is applied to the interior of the uppermost groove. The region of the piston cylindrical body surrounding the groove opening is free of that coating.

The present invention may further fulfill the foregoing needs by providing in another exemplary embodiment a piston for a two-stroke direct fuel injection internal combustion engine coupled to drive a marine vessel. The piston has a generally cylindrical body with two grooves formed therein. Each groove defines an opening to receive a respective piston ring. A thermal-protection coating is applied by anodizing to the interior of the grooves. The respective region of the piston cylindrical body surrounding the respective groove openings is free of that coating.

In another aspect of the invention, a method for improving durability of a two-stroke marine direct fuel injection internal combustion engine is provided. The method allows for anodizing respective surfaces that define one or more respective grooves in a piston of the engine. The groove surfaces define an opening for receiving a respective piston ring, and wherein any exterior region of the piston surrounding the groove opening is free from the coating.

Figure 1:
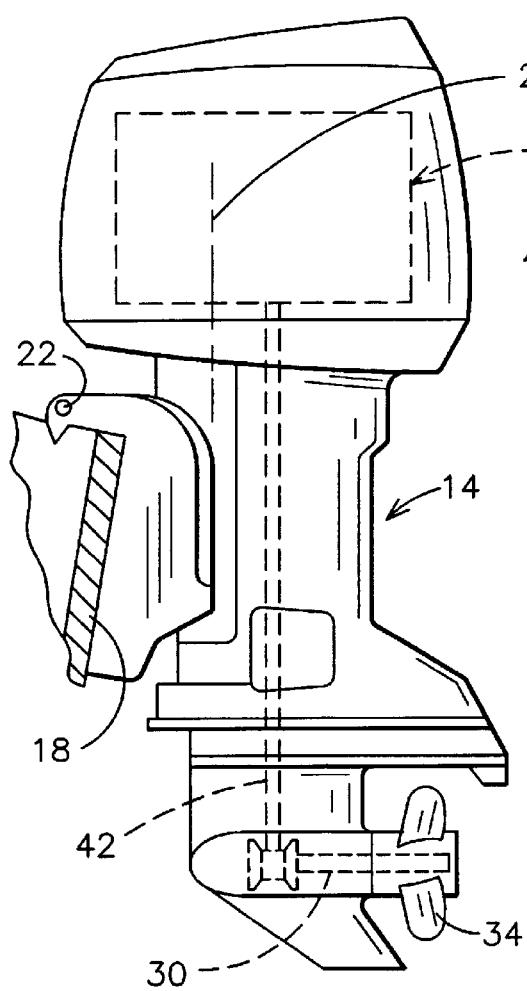
FIG. 1 is a side elevational view of an exemplary marine propulsion device that may benefit from the present invention.

Before any embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

An exemplary marine propulsion device 10 embodying the invention is illustrated in FIG. 1.

The marine propulsion device 10 includes an outboard drive unit 14 adapted to be mounted to the transom 18 of a boat for pivotal tilting movement relative thereto about a generally horizontal tilt axis 22 and for pivotal steering movement relative thereto about a generally vertical steering axis 26. The drive unit 14 includes a propeller shaft 30 having a propeller 34 fixed thereto. The drive unit 14 also includes a direct fuel-injected, two-stroke internal combustion engine 38 drivingly connected to the propeller shaft 30 by a standard drive train 42. In one exemplary embodiment of the invention, the engine 38 may be a six-cylinder V-type engine. It should be understood, however, that the invention is applicable to other types of engines with any number of cylinders. It should be further understood that the present invention need not be limited to outboard drives since other types of marine propulsion devices, such as stem drives, could also benefit from the present invention.

Figure 2:
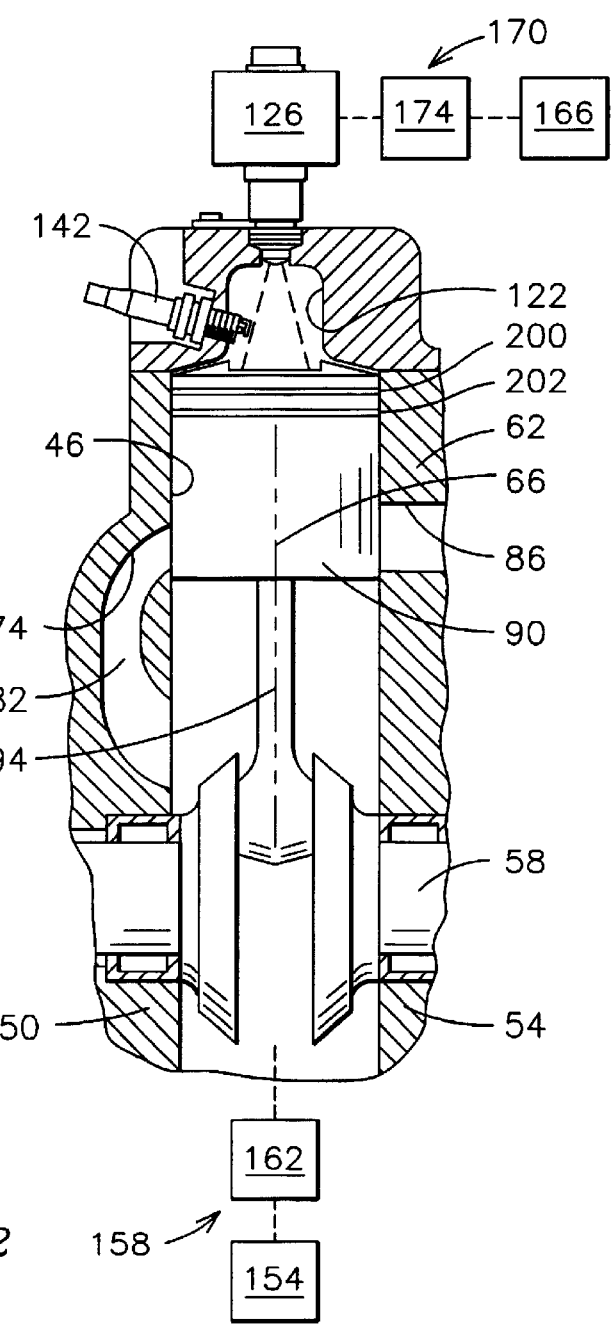
FIG. 2 is a partial sectional view of an exemplary engine having a piston embodying the present invention.

FIG. 2 illustrates an exemplary construction of a multi-cylinder engine embodying the present invention. For the sake of clarity and brevity only one cylinder 46 of the engine is illustrated in FIG. 2. The engine includes a crankcase 50 defining a crankcase chamber 54 and having a crankshaft 58 rotatable therein. An engine block 62 defines the cylinder 46, which has a longitudinal axis 66 and an upper end (the upper end in FIG. 2). In the illustrated construction, the cylinder 46 has a diameter D of 3.600 inches, so that the cross-sectional area of the cylinder 46 in a plane perpendicular to the axis 66 is approximately 10.18 square inches. The engine block 62 also defines respective intake ports communicating with the cylinder 46. Each of the ports communicates with the crankcase chamber 54 via a respective transfer passage 82 (one shown in FIG. 2). The engine block 62 also defines an exhaust port 86 which communicates with the cylinder 46 and which may be located diametrically opposite one of the intake ports.

Figure 3:
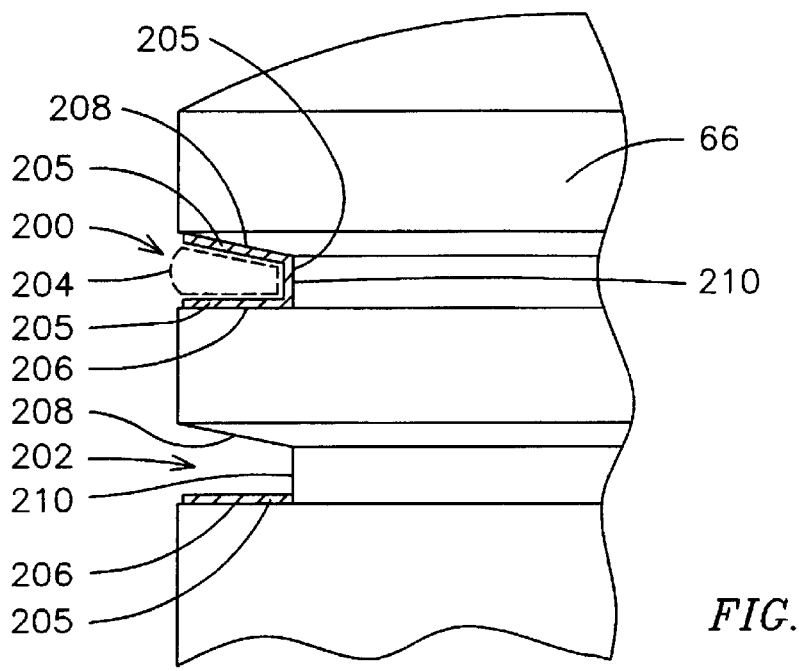
FIG. 3 is an enlarged portion of the piston shown in FIG. 2.

The engine also includes a piston 90 having a generally cylindrical body reciprocally moveable in the cylinder 46 along the axis 66. The piston may include one or more thermally-protected grooves, e.g., grooves 200 and 202 for receiving a respective piston ring 204 (FIG. 3). As described in greater detail in the context of FIG. 3, the thermal protection is achieved by applying an anodic coating 205 (FIG. 3) contained within the interior of the grooves.

The piston 90 is drivingly connected to the crankshaft 58 by a crank pin 94. The engine also includes a cylinder head 110 including a lower surface portion 114 closing the upper end of the cylinder 46 so as to define a combustion chamber 118 between the piston upper surface 98 and the cylinder head lower surface portion 114. When the piston 90 is at top dead center, the piston upper surface 98 is spaced a predetermined distance from the cylinder head lower surface portion 114. The cylinder head lower surface portion 114 extends generally perpendicular to the cylinder axis 66 and has therein an upwardly extending recess or dome 122. The cylinder head lower surface portion 114 surrounding the recess 122 is concave and is complementary with the piston upper surface 98. In the exemplary embodiment shown, the recess 122 is located directly above the bowl 102 and is generally cylindrical and centered on the cylinder axis 66. The recess area for the engine shown in FIG. 2 is equal to approximately one-fifth the cross-sectional area of the cylinder 46, so that there is a squish area comprising approximately 80% of the cross-sectional area of the cylinder 46.

In another exemplary embodiment, recess 122 may be chosen to have at its lower end an area approximately equal to 50% of the cross-sectional area of the cylinder 46, so that there is a squish area comprising approximately 50% of the cross-sectional area of the cylinder 46. The area of the cylinder outside the recess is referred to by those skilled in the art as the squish area. Thus, the recess area may correspond to the base of a conically-shaped recess having a cone-axis co-axially positioned relative to the cylinder axis. It will be appreciated that depending on the particular implementation further reductions in the squish area may be achieved, such as 35% to 40%, provided it is understood that tradeoffs of improved high speed operation versus low speed performance are acceptable. It will be appreciated that the present invention may be particularly useful for two-stroke direct fuel injected engines having a compression ratio ranging from about 5.75 to 1 to about 7.75 to 1. Further, the present application may be particularly useful in direct fuel-injected engines using either a homogeneous combustion process or stratified combustion process or both. Generally, in a homogeneous combustion process the air-fuel mixture is supplied to the cylinder via the transfer ports with much of the fuel already vaporized during its residence in the hot crankcase. The remainder of the liquid fuel vaporizes during the combustion process so that by the time ignition takes place, the combustion chamber is filled with a vapor-air exhaust gas residual mixture which is evenly distributed throughout the combustion space. In a stratified combustion process there will be zones in the combustion space which are at differing air-fuel ratios. It will be appreciated that the present invention, It will be appreciated by those skilled in the art that in general recess 122 need not be centered on the cylinder axis. For example, the recess could be configured as an asymmetrical recess relative to the cylinder axis, provided the squish area and the volume defined by such non-symmetrical recess remain the same relative to the corresponding parameters of the symmetrical recess.

The engine also includes a fuel injector 126 mounted on the cylinder head 110 for injecting fuel into the upper end of the recess 122. The fuel injector 126 creates a cone 130 of fuel spray surrounded by a volume of fuel vapor, the cone 130 being centered on the cylinder axis 66.

The engine 38 also includes a spark plug 142 which is mounted on the cylinder head 110 and which extends into the recess 122. In the illustrated construction, the spark plug 142 extends along a plug axis 146 which is located in the plane of the cone axis 134. Also, the spark plug 142 is located directly above the intake port 74. The spark plug 142 includes a spark gap 150 located outside the fuel spray cone 130 and within the fuel vapor volume, so that the spark plug 142 initially ignites fuel vapor rather than directly igniting the fuel spray. Ignition is timed so that the spark plug 142 ignites the fuel spray before the fuel spray strikes the piston upper surface 98. The engine 38 also includes a source of primary lubricant, i.e. an oil tank 154 (shown schematically in FIG. 2), and a lubricant supply system 158 for supplying oil from the oil tank 154 to the crankcase 50 of the engine 38. The lubricant supply system 158 includes an oil pump 162 communicating between the oil tank 154 and the crankcase chamber 54. The lubricant supply system 158 supplies oil directly to the various crankcase chambers 54 of the engine 38.

The engine also includes a source of fuel, i.e. a fuel tank 166 (shown schematically in FIG. 2), and a fuel supply system 170 for supplying fuel to the various fuel injectors 126 of the engine 38. The fuel supply system 170 includes a fuel pump 174 communicating between the fuel tank 166 and the fuel injectors 126. The engine may include a source of secondary lubricant which is mixed with the fuel injected into the cylinders 46. The purpose of the secondary lubricant is not lubrication of the engine 38, but is reduction of spark plug fouling. Although a separate lubricant source could be employed the source of fuel and the source of secondary lubricant may be a single tank (the fuel tank 166) of mixed fuel and oil.

It will be appreciated by those skilled in the art that the fuel injector described above is one example of a type of injector commonly referred to as single fluid, direct fuel injection delivery. Another type of injector uses a high pressure pump for pressurizing a high pressure line to deliver fuel to the fuel injector through a fuel rail that delivers fuel to each injector. A pressure control valve may be coupled at one end of the fuel rail to regulate the level of pressure of the fuel supplied to the injectors to maintain a substantially constant pressure thereat. The pressure may be maintained by dumping excess fuel back to the vapor separator through a suitable return line. The fuel rail may incorporate nipples that allow the fuel injectors to receive fuel from the fuel rail. Thus, in this case, it is believed that a substantially steady pressure differential—as opposed to a pressure surge—between the fuel rail and the nipples causes the fuel to be injected into the fuel chamber. Another example of direct fuel injection is a dual-fluid injection system that could be used include those that include a compressor or other compressing means configured to provide the source of gas under pressure to effect injection of the fuel to the engine, that is, fuel injectors that deliver a metered individual quantity of fuel entrained in a gas. It is to be understood, however, that the present invention is not limited to any particular type of direct fuel injector.

FIG. 3 shows an exemplary construction of the piston ring grooves. As shown in FIG. 3, each piston ring groove may comprise a lower surface 206, an upper surface 208 and a rear surface 210 facing an opening that receives the piston ring 204, only shown in groove 200 for simplicity of illustration. As suggested above, the upper and/or lower grooves may be applied a thermal-protection coating or thermal barrier 205, such as an anodic coating ranging in thickness from about 10 to 30 microns or more, using standard anodizing techniques well-understood by those of ordinary skill in the art. Anodic coating or anodizing refers to the electrolytic treatment of aluminum, magnesium and other metals as a result of which heavy, stable films of oxide are formed on their surfaces. Exemplary electrolytes used for triggering the anodizing may include sulfuric, oxalic and chromic acids and generally the metal acts as the anode. The resulting anodic coating is relatively hard and has good thermal insulating properties. Thus, anodizing converts a standard piston groove surface, such as made of hypereutectic aluminum into a hard and porous coating of aluminum oxide or alumina. This hard and porous layer allows for eliminating or substantially reducing micro-welding of the piston ring to the groove surfaces, particularly surfaces such as the lower surface that would otherwise carry most of the heat load passing therebetween. It is believed that the anodic coating resists better such heat load because of the following properties: its extreme hardness, e.g., about 70 RC or harder; its porosity allows for retaining and carrying lubricating fluids, such as oil; and being a ceramic, the anodic coating has anti-seize lubricating properties by creating a solid film of lubricant. It will be appreciated that each of the surfaces may be anodized simultaneously or, if desired, just one, preferably the lower surface or two of the surfaces could be anodized using a suitably configured masking device. In one key feature of the present invention, the anodic coating is contained to within the interior of any groove which receives such coating so that any region of the piston cylindrical body surrounding the groove opening is free or devoid from the anodic coating. This may be achieved by mechanically removing from the region surrounding the groove opening, such as by machining, any coating that may form outside the groove. Alternatively, at the time of anodizing the groove, the region surrounding the groove opening could be masked using standard masking devices readily known to one of ordinary skill in the art to specifically prevent formation of the anodic coating outside the groove.

Figure 4:
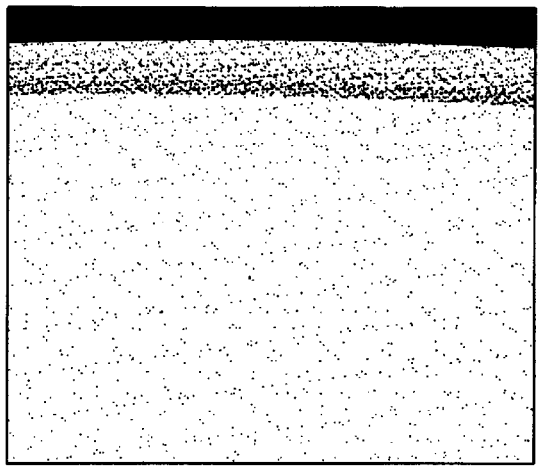
FIGS. 4 and 5 respectively illustrate test results in a piston groove having the anodic coating of the present invention (FIG. 4), and in a non-anodized piston groove (FIG. 5).
Figure 5:
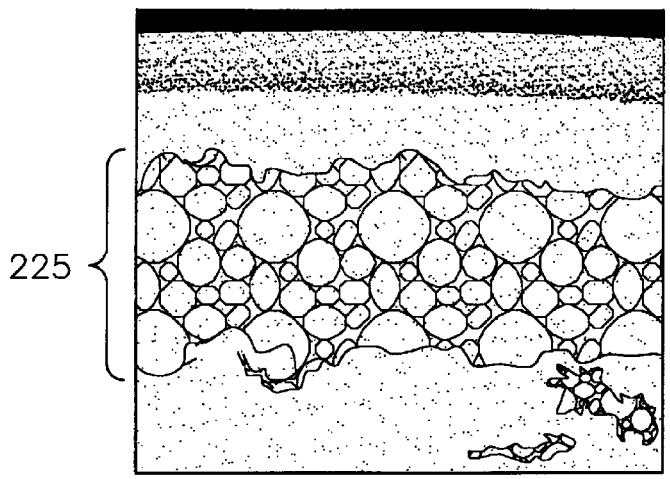

FIGS. 4 and 5 are respective microphotography-based drawings that allow for visually comparing after a defined number of hours, e.g., 44 hours, of durability testing the respective lower surfaces of the upper piston ring groove which in the case illustrated in FIG. 4 has the anodic coating of the present invention applied thereto. In the case illustrated in FIG. 5, the groove surface lacks the anodic coating, that is, the standard piston groove comprises surfaces of hypereutectic aluminum. It will be appreciated that the thermal-protection characteristics of the anodized groove prevented the piston ring from becoming damaged due to micro-welding, as evidenced by the absence of transferred aluminum in FIG. 4. Conversely, as shown in FIG. 5, the groove surface lacking the anodic coating exhibited general wear due to micro-welding to the piston ring as evidenced by the aluminum material welded to the piston ring, such welded aluminum material represented by a darkened region 225 in FIG. 5.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A two-stroke internal combustion engine comprising:
   an engine block defining a cylinder having a longitudinal axis and an upper end, the engine block further defining a transfer port configured to pass into said cylinder a combustion-supporting fluid from a crankshaft chamber;
   a piston reciprocally moveable in said cylinder along said axis, the piston comprising an upper surface portion and a generally cylindrical body extending from said upper surface;
   a cylinder head including a lower surface portion closing said upper end of said cylinder to define a combustion chamber between the piston upper surface and said cylinder head lower surface portion;
   at most two grooves formed in the piston cylindrical body, each groove defining an opening to receive a respective piston ring; and
   an anodic coating applied to at least the upper groove, any region of the piston cylindrical body surrounding the groove opening being free of said coating.

2. The internal combustion engine of claim 1 wherein the combustion-supporting fluid passed by the transfer port to the cylinder from the crankshaft chamber is air.

3. The internal combustion engine 1 wherein each groove comprises a lower surface, an upper surface and a rear surface interposed between the lower and upper surfaces and wherein the coating is applied at least to the lower surface.

4. The internal combustion engine of claim 1 wherein the groove comprises a lower surface, an upper surface and a rear surface interposed between the lower and upper surfaces and wherein the coating is simultaneously applied to each groove surface.

5. The internal combustion engine of claim 1 wherein said engine further comprises a fuel injector for directly injecting fuel into the combustion chamber.

6. The internal combustion engine of claim 5 wherein said engine further comprises a spark plug having a spark gap located within the combustion chamber to ignite the fuel delivered by the fuel injector.

7. The internal combustion engine of claim 5 wherein the fuel injector is configured to deliver fuel to the combustion chamber not entrained in a gas.

8. The internal combustion engine of claim 7 wherein the fuel injector delivers fluid due to a pressure surge.

9. The internal combustion engine of claim 7 wherein the fuel injector delivers fluid due to a pressure differential.

10. The internal combustion engine of claim 5 wherein the fuel injector is configured to deliver to the chamber fuel that is entrained in a predetermined gas.

11. The internal combustion engine of claim 10 wherein the predetermined gas is air.

12. The internal combustion engine of claim 10 wherein the fuel is compressed to be entrained within the predetermined gas by a compressor.

13. A direct fuel combustion engine comprising:
   an engine block defining a cylinder having a longitudinal axis and an upper end;
   a piston reciprocally moveable in said cylinder along said axis, the piston comprising an upper surface portion and a generally cylindrical body extending from said upper surface;
   a cylinder head including a lower surface portion closing said upper end of said cylinder to define a combustion chamber between the piston upper surface and said cylinder head lower surface portion;
   a fuel injector for directly injecting fuel into the combustion chamber; and
   one or more piston ring grooves formed in the piston cylindrical body, and wherein only the interior of at least the upper groove is anodized.

14. The internal combustion engine of claim 13 wherein each groove comprises a lower surface, an upper surface and a rear surface interposed between the lower and upper surfaces and wherein each groove surface is anodized.

15. The internal combustion engine of claim 13 wherein said engine is a two-stroke engine.

16. The internal combustion engine of claim 13 wherein the fuel injector is configured to deliver to the combustion chamber fuel comprising a single fluid.

17. The internal combustion engine of 16 wherein the fuel injector delivers fluid due to a pressure surge.

18. The internal combustion engine of claim 16 wherein the fuel injector delivers fluid due to a pressure differential.

19. The internal combustion engine of claim 13 wherein the fuel injector is configured to deliver to the chamber fuel that is entrained in a predetermined gas.

20. The internal combustion engine of claim 19 wherein the predetermined gas is air.

21. An internal combustion engine comprising:
   a piston having a generally cylindrical body with one or more grooves formed therein, each groove defining an opening to receive a respective piston ring;
   one or more grooves formed in the piston cylindrical body, each groove defining an opening to receive a respective piston ring, and wherein only the interior of at least the upper groove is anodized; and
   a marine propulsion unit being coupled to receive driving power from the engine.

22. The internal combustion engine of claim 21 wherein the groove comprises a lower surface, an upper surface and a rear surface interposed between the lower and upper surfaces and wherein the coating is applied at least to the lower surface.

23. The internal combustion engine of claim 21 wherein the groove comprises a lower surface, an upper surface and a rear surface interposed between the lower and upper surfaces and wherein the coating is simultaneously applied to each groove surface.

24. The internal combustion engine of claim 21 wherein said engine further comprises a fuel injector for directly injecting fuel into a combustion chamber.

25. Two-stroke direct fuel injection engine comprising:
   an engine block defining a cylinder having a longitudinal axis and an upper end, the engine block further defining a transfer port for passing into said cylinder combustion-supporting air from a crankshaft chamber;
   a piston reciprocally moveable in said cylinder along said axis, the piston comprising an upper surface portion and a generally cylindrical body extending from said upper surface;
   a cylinder head including a lower surface portion closing said upper end of said cylinder to define a combustion chamber between the piston upper surface and said cylinder head lower surface portion;
   at most two grooves formed in the piston cylindrical body, each groove defining an opening to receive a respective piston ring;
   a fuel injector for directly injecting fuel into the combustion chamber; and
   at most two grooves formed in the piston cylindrical body, each groove defining an opening to receive a respective piston ring, and wherein only the interior of at least the upper groove is anodized.

26. A two-stroke internal combustion engine comprising:
   an engine block defining a cylinder having a longitudinal axis and an upper end, the engine block further defining a transfer port for passing into said cylinder a combustion-supporting fluid from a crankshaft chamber;
   a piston reciprocally moveable in said cylinder along said axis, the piston comprising an upper surface portion and a generally cylindrical body extending from said upper surface;
   a cylinder head including a lower surface portion closing said upper end of said cylinder to define a combustion chamber between the piston upper surface and said cylinder head lower surface portion;
   at most two grooves formed in the piston cylindrical body, each groove defining an opening to receive a respective piston ring;
   an anodic coating applied to the interior of at least the upper groove, the region of the piston cylindrical body surrounding the groove opening being free of said coating and wherein the engine is coupled to drive a marine propulsion unit.

27. An direct fuel injection internal combustion engine comprising:
   an engine block defining a cylinder having a longitudinal axis and an upper end;
   a piston reciprocally moveable in said cylinder along said axis, the piston comprising an upper surface portion and a generally cylindrical body extending from said upper surface;
   a cylinder head including a lower surface portion closing said upper end of said cylinder to define a combustion chamber between the piston upper surface and said cylinder head lower surface portion;
   a fuel injector for directly injecting fuel into a combustion chamber; and
   one or more piston ring grooves formed in the piston cylindrical body, wherein only the interior of at least the upper groove is anodized, and further wherein the engine is coupled to drive a marine propulsion unit.

28. A two-stroke direct fuel injection internal combustion engine comprising:
- an engine block defining a cylinder having a longitudinal axis and an upper end, the engine block further defining a transfer port for passing into said cylinder a combustion-supporting fluid from a crankshaft chamber;
- a piston reciprocally moveable in said cylinder along said axis, the piston comprising an upper surface portion and a generally cylindrical body extending from said upper surface;
- a cylinder head including a lower surface portion closing said upper end of said cylinder to define a combustion chamber between the piston upper surface and said cylinder head lower surface portion;
- at most two grooves formed in the piston cylindrical body, each groove defining an opening to receive a respective piston ring;
- a fuel injector for directly injecting fuel into a combustion chamber; and
- one or more grooves formed in the piston cylindrical body, each groove defining an opening to receive a respective piston ring, and wherein only the interior of at least the upper groove is anodized, and further wherein the engine is coupled to drive a marine propulsion unit.

29. A method for improving durability of a two-stroke marine direct fuel injection internal combustion engine which comprises anodizing respective surfaces that define at most two respective grooves -in a piston of the engine, the groove surfaces defining an opening for receiving a respective piston ring, and wherein any exterior region of the piston surrounding the groove opening is free from said coating.

30. A piston for a two-stroke direct fuel injection internal combustion engine coupled to drive a marine propulsion unit, the piston having a generally cylindrical body with two grooves formed therein, each groove defining an opening to receive a respective piston ring, and a thermal-protection coating applied by anodizing to the interior of the grooves, the respective region of the piston cylindrical body surrounding the respective groove openings being free of said coating.

31. A two-stroke direct fuel injection internal combustion engine comprising:
- means for defining a cylinder having a longitudinal axis and an upper end;
- means for passing combustion-supporting air into the cylinder from a crankshaft chamber;
- piston means for effecting reciprocal movement in said cylinder along said axis;
- means for closing said upper end of said cylinder to define a combustion chamber;
- means for directly injecting fuel into the combustion chamber;
- groove means formed in the piston means for receiving ring sealing means, and wherein only the groove means is anodized; and
- means for propelling a marine vessel coupled to receive power from the engine.

* * * * *

UNITED STATES PATENT AND TRADEMARK OFFICE
CERTIFICATE OF CORRECTION

PATENT NO.    : 6,425,364 B1
DATED         : July 30, 2002
INVENTOR(S)   : Craft et al.

It is certified that error appears in the above-identified patent and that said Letters Patent is hereby corrected as shown below:

<u>Column 3,</u>
Line 5, delete the word "stem" and substitute therefor -- stern --;

<u>Column 7,</u>
Line 13, insert -- injection internal -- before "combustion";

Signed and Sealed this

Seventeenth Day of December, 2002

JAMES E. ROGAN
*Director of the United States Patent and Trademark Office*